G. H. LOMAX.
COMBINED SALT AND PEPPER-BOX.
No. 169,363. Patented Nov. 2, 1875.
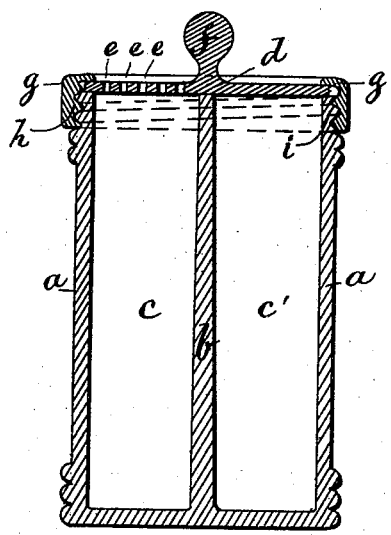
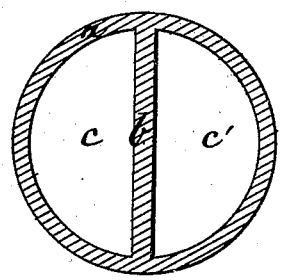
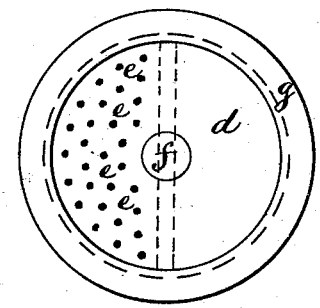
Witnesses:
F. Allen
A. Torrey
Inventor:
George H. Lomax
by Alban Andrén, atty.

UNITED STATES PATENT OFFICE.

GEORGE H. LOMAX, OF SOMERVILLE, MASSACHUSETTS.

IMPROVEMENT IN COMBINED SALT AND PEPPER BOXES.

Specification forming part of Letters Patent No. 169,363, dated November 2, 1875; application filed August 25, 1875.

*To all whom it may concern:*

Be it known that I, GEORGE HENRY LOMAX, of Somerville, in the county of Middlesex and State of Massachusetts, have invented certain new and useful Improvements in Combined Salt and Pepper Box; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to an improved salt and pepper box combined; and consists of a box, made of glass or suitable material, having one or more division-walls extending from bottom to top, by which the box is divided in two or more compartments, for the purpose of containing salt, pepper, or spice. The top of the box is covered by means of a rotary cover, provided with perforations on a part of its surface corresponding to the size of one of the compartments—that is, if I use only two compartments, I provide the rotary cover with perforations on about one-half of its surface; if more than two compartments are used, I make the perforated part of the cover of a proportionate size—so that, by placing the perforations directly above any desired compartment, the salt, pepper, or spice contained therein can easily be shaken out without letting any of the ingredients contained in the other compartments escape.

The rotary cover above named is held in close proximity to the upper end of the box by means of an annular flange, provided with a screw-thread, that is screwed around a similar screw-thread on the outside of the upper end of the box.

By this my invention one and the same box is made to contain a variety of salt, pepper, or spices; and any desired compartment may be emptied of its contents merely by turning the cover so that its perforated part shall come directly above the compartment containing the desired salt or spice.

This is a very convenient utensil, both on the table to serve as a caster, in the kitchen to serve as a salt, pepper, or spice box combined, or for traveling purposes.

On the accompanying drawing, Figure 1 represents a plan of my invention. Fig. 2 represents a central longitudinal section, and Fig. 3 represents a cross-section of the same.

Similar letters refer to similar parts wherever they occur on the different parts of the drawings.

On the drawing I have only shown one division-wall and two compartments; but, when so required, I may make more than one division-wall and two compartments.

$a$ represents the box, and $b$ represents the division-wall therein, extending from bottom to top of the box $a$. By means of the wall $b$ the box $a$ is divided in two separate compartments, $c$ $c'$, as shown. $d$ represents the rotary cover, having perforations $e$ $e$ $e$ on a part of its surface, for the purpose set forth. The cover $d$ is provided with a knob or handle, $f$, by means of which it can easily be turned around its center. $g$ represents an annular flanged ring, having a screw-thread, $h$, on its inner side, that is screwed around a similar screw-thread, $i$, on the outside of the upper end of the box $a$.

By means of this flanged ring $g$ the cover $d$ is held in close proximity with the top of the box $a$, so as to prevent the salt or spice in one compartment from getting into the next one.

The operation of my invention is very simple: Suppose two compartments only were used, one containing salt, and the other one pepper. If I desired to obtain the salt from the box, it would only be necessary to rotate the cover, so that its perforated part would come directly above the salt-compartment, and the solid part of the cover would then come directly above the pepper-compartment. If the box is turned upside down it will be seen that the salt only can escape through the perforated cover.

If the pepper is wanted, I turn the cover about half a revolution, when the perforations in the cover come directly above the pepper-compartment, whereas the salt-box would be closed at the top.

I do not claim, broadly, a divided vessel and a rotary cover; nor do I claim an arrangement as set forth in John Coulthard's patent, March 30, 1875, No. 161,484; but What I wish to secure by Letters Patent, and claim, is—

In combination, the divided vessel $a\ b\ c\ c'$, and its outer screw-thread at the top, the partially-perforated rotary cover $d$, and outer annular flanged screw-threaded ring $g$, as and for the purpose set forth and described.

In testimony that I claim the foregoing as my own invention, I have affixed my signature in presence of two witnesses.

GEORGE HENRY LOMAX.

Witnesses:
ALBAN ANDRÉN,
HENRY K. BARNES.